United States Patent [19]

Saito

[11] Patent Number: 4,630,156
[45] Date of Patent: Dec. 16, 1986

[54] FLEXIBLE MAGNETIC DISC INCLUDING HUB STRUCTURE

[75] Inventor: Etsuro Saito, Ayase, Japan

[73] Assignee: Sony Corporation, Tokyo, Japan

[21] Appl. No.: 577,780

[22] Filed: Feb. 7, 1984

[30] Foreign Application Priority Data

Feb. 10, 1983 [JP] Japan ............................ 58-18575[U]
Mar. 4, 1983 [JP] Japan ............................ 58-31442[U]

[51] Int. Cl.⁴ ...................... G11B 23/03; G11B 5/016; G01D 15/24; G01D 15/26
[52] U.S. Cl. ..................................... 360/133; 360/99; 346/137; 369/282
[58] Field of Search ................... 360/133, 137, 97, 99, 360/135, 86; 346/137; 369/282, 290

[56] References Cited

U.S. PATENT DOCUMENTS

| | | | |
|---|---|---|---|
| 1,846,378 | 2/1932 | Acheson | 369/282 |
| 3,947,839 | 3/1976 | Hall, Sr. | 360/133 |
| 4,017,862 | 1/1978 | Lathrop, Jr. et al. | 360/133 |
| 4,149,207 | 4/1979 | Porter, Jr. et al. | 360/133 |
| 4,459,628 | 7/1984 | Barton | 360/97 |
| 4,466,032 | 8/1984 | Saito | 360/99 |
| 4,503,474 | 3/1985 | Nigam | 360/133 |

FOREIGN PATENT DOCUMENTS

| | | | |
|---|---|---|---|
| 0116471 | 8/1983 | European Pat. Off. | 360/135 |
| 0739859 | 11/1955 | United Kingdom | 369/240 |

OTHER PUBLICATIONS

IBM Technical Disclosure Bulletin, vol. 13, No. 5, Oct. 77, p. 1242, "Disk Pack Locating Device", by A. Kluth.
IBM Technical Disclosure Bulletin, vol. 19, No. 12, May 77, pp. 4722–4723, "Hub Assembly for Flexible Disk Media", by J. L. Beck et al.

Primary Examiner—John H. Wolff
Assistant Examiner—Alfonso Garcia
Attorney, Agent, or Firm—Lewis H. Eslinger; Alvin Sinderbrand

[57] ABSTRACT

In a flexible magnetic disc adapted for mounting on a drive spindle of a recording and/or reproducing apparatus and having a hub structure secured to a flexible magnetic sheet member at the center of the latter and defining a bore for receiving the drive spindle; the hub structure includes a substantially circular metal plate with a central aperture substantially registering with the bore and which, at its edge, defines a pair of positioning surfaces projecting into the bore at locations spaced apart about its axis, and a metal spring also projecting into the bore at a side of the latter remote from the positioning surfaces and located by positioning seats also defined at the edge of the aperture in the circular metal plate for engaging the metal spring with the drive spindle in the bore and securely seating the drive spindle against the metal positioning surfaces.

20 Claims, 13 Drawing Figures

FLEXIBLE MAGNETIC DISC INCLUDING HUB STRUCTURE

BACKGROUND OF THE INVENTION

1. Field of the Invention

This invention relates generally to information record discs employing a flexible magnetic sheet material as the record medium, and more particularly is directed to improvements in the hub structure of such flexible magnetic discs.

2. Description of the Prior Art

It has been proposed to employ a flexible magnetic disc, preferably rotatable within a flat cassette casing, for recording video or other signals in a series of concentric, circular tracks, on a flexible magnetic sheet member of the disc which further includes a hub structure secured to the center of the sheet member. The hub structure of the magnetic disc defines a bore for receiving a drive spindle of a recording and/or reproducing apparatus by which the flexible magnetic disc is rotated during recording or reproducing of the information signals by means of a magnetic head scanning the respective circular track on the flexible magnetic sheet member. In order to minimize the diameter of the disc and still provide for the recording on the disc of a substantial quantity of video or other information, it is necessary to employ high density recording with minimum if any clearances between the adjacent tracks. Such high density recording requires the avoidance of disc eccentricity, particularly when various discs are interchanged with each other or employed in different recording and/or reproducing apparatus.

In a proposed flexible magnetic disc of the above-described type, the hub structure is molded of a synthetic resin and is formed, within the bore which receives the drive spindle, with oppositely angled positioning surfaces which converge in the direction away from the center or axis of the bore, and further with one or more resilient tabs or members molded as integral parts of the hub structure at a side of the bore remote from the positioning surfaces and engageable with the drive spindle in the bore for securely seating the drive spindle against the positioning surfaces. However, the foregoing arrangement is not completely satisfactory in avoiding disc eccentricity in that, by reason of the molding of the positioning surfaces and resilient tabs or member as integral parts of the hub structure formed of a synthetic resin, the dimensions and relative positions of such elements provided for locating the center of the flexible magnetic disc in respect to the axis of rotation of the drive spindle may vary from one disc to another and with time. Further, the spring force with which the resilient tabs or member molded integrally with the hub structre are effective to press the drive spindle against the positioning surfaces is also variable due to dimensional variations of these parts as molded and with time, for example, due to wearing away of the resilient tabs or member or the positioning surfaces with repeated use of the flexible magnetic disc.

OBJECTS AND SUMMARY OF THE INVENTION

Accordingly, it is an object of this invention to provide a flexible magnetic disc which is capable of being reliably centered with extremely high precision relative to a drive spindle.

Another object is to provide a flexible magnetic disc, as aforesaid, which does not lose its capacity for extremely precise centering relative to a drive spindle even after repeated use of the disc.

A further object is to provide a flexible magnetic disc, as aforesaid, which can be easily and inexpensively produced.

In accordance with an aspect of this invention, a flexible magnetic disc adapted for mounting on a drive spindle of a recording and/or reproducing apparatus comprises a flexible magnetic sheet member having a circular periphery, and a hub structure secured to the sheet member at the center of the latter and having a bore extending axially therethrough for receiving the drive spindle, such hub structure including metal means defining a pair of positioning surfaces projecting into the bore at locations spaced apart about the axis of the bore, and a resilient member also projecting into the bore at a side of the latter remote from the positioning surfaces and engageable with the drive spindle therein for securely seating the drive spindle against the metal positioning surfaces.

In a preferred embodiment of this invention, the resilient member for urging the drive spindle against the metal positioning surfaces is a metal spring, and the metal positioning surfaces are defined by edge portions of a central aperture in a substantially circular metal plate included in the hub structure, with the metal spring being precisely and reliably located by positioning seats therefor also defined by edge portions of the aperture in the circular metal plate.

The above, and other objects, features and advantages of this invention, will be apparent in the following detailed description of an illustrative embodiment which is to be read in connection with the accompanying drawings in which corresponding parts are identified by the same reference numerals.

DETAILED DESCRIPTION OF A PREFERRED EMBODIMENT

Before proceeding with a detailed description of the invention, reference will be made to FIGS. 1A and 1B which illustrate an existing magnetic disc cassette 1 comprised of a relatively flat casing 2 which may be rectangular, as shown, and which contains a rotatable flexible magnetic disc 3. Such magnetic disc cassette 1 may be used as a recording medium for a microcomputer or in an electronic still camera incorporating a CCD. The flexible magnetic disc 3 is shown to have a central hub structure 4 for mounting on a disc drive unit, for example, of the kind disclosed in detail in the copending U.S. Patent Application Ser. No. 06/537,989, filed Oct. 3, 1983, and having an assignee in common herewith. The central hub structure 4 has a bore 5 extending axially therethrough, and is exposed at central holes 7 and 8 formed in the opposed walls of cassette casing 2. A magnetic metal ring 9 (FIG. 1B), for example, of permalloy, is secured to the surface of hub structure 4 exposed at hole 8, and is adapted to be magnetically attracted to a magnet of the disc drive unit when the spindle of the latter is received in bore 5. A shutter 10 is slidably mounted on casing 2 for movement along one of the straight sides thereof between an open position shown in full lines on FIGS. 1A and 1B, and in which windows 11 and 12 provided in the opposed walls of casing 2 are uncovered, and a closed position (not shown) in which shutter 10 extends over and closes windows 11 and 12 for protecting the flexible magnetic disc 3 within casing 2 when cassette 1 is not in use. When cassette 1 is being used, shutter 10 is suitably moved to its opened position for uncovering windows 11 and 12 and thereby permitting a pressure pad and a magnetic recording and/or reproducing head to be extended through windows 11 and 12, respectively, for engagement with the opposite surfaces of the flexible magnetic disc 3.

Figure 1A:
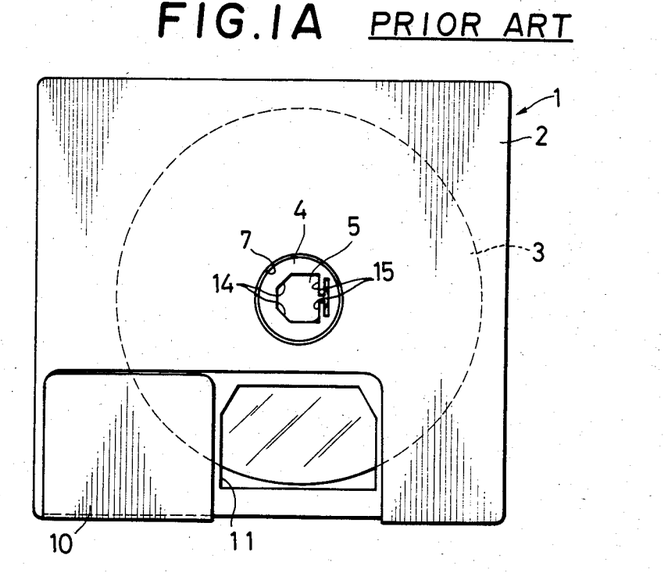
FIGS. 1A and 1B are front and rear elevational views, respectively, of a cassette which includes a previously proposed flexible magnetic disc.
Figure 1B:
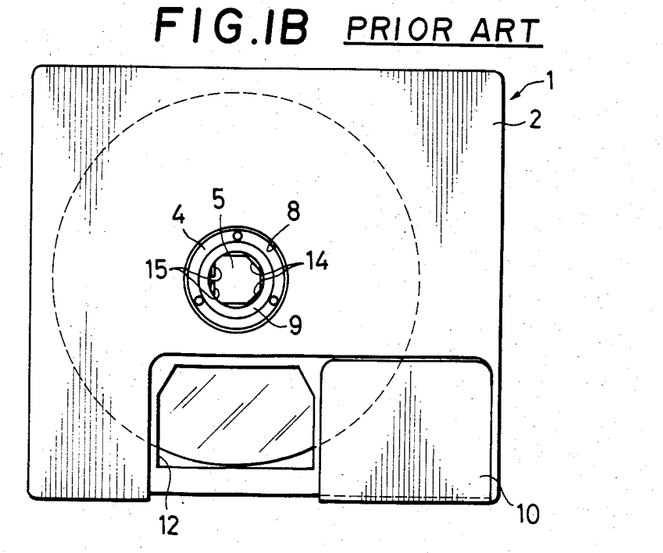

In the previously proposed flexible magnetic disc included in the cassette 1 shown on FIGS. 1A and 1B, the molded structure 4 is integrally formed, within the bore 5 which is intended to receive the drive spindle, with oppositely angled positioning surfaces 14 which converge in the direction away from the center or axis of bore 5, and further with a pair of oppositely directed resilient tabs 15 extending toward each other within bore 5 at the side of the latter remote from positioning surfaces 14. When a cylindrical drive spindle is inserted in bore 5, it is intended that the resilient tabs 5, acting as cantilevered springs, will act against the surface of the drive spindle and urge the latter into secure seating engagement with positioning surfaces 14 which, by reason of their converging relation, are intended to center flexible magnetic disc 3 in respect to the axis of rotation of the drive spindle. However, by reason of the molding of the positioning surfaces 14 and resilient tabs 15 as integral parts of the hub structure 4 formed of a synthetic resin, the dimensions and relative positions of surfaces 14 and tabs 15 may vary from one disc to another and with time. Further, the spring forces with which the resilient tabs 15 press the drive spindle against positioning surfaces 14 are also variable due to dimensional variations of surfaces 14 and tabs 15, as molded and with time, for example, due to fatigue and/or wearing away of surfaces 14 and tabs 15 with repeated use of flexible magnetic disc 3. Therefore, the known hub structure 4 is not capable of the reliable, precise centering of disc 3 relative to the drive spindle particularly after repeated uses of cassette 1.

Figure 10:
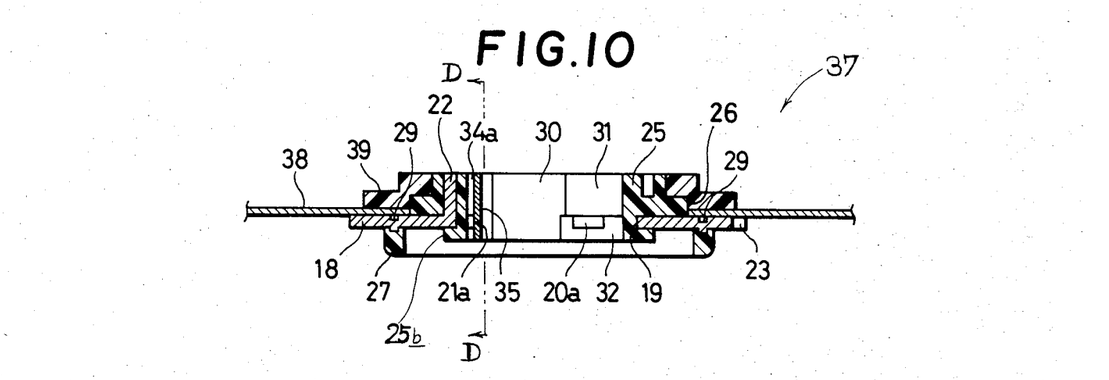
FIG. 10 is a sectional view similar to that of FIG. 5, but showing the completed flexible magnetic disc according to this invention.
Figure 11:
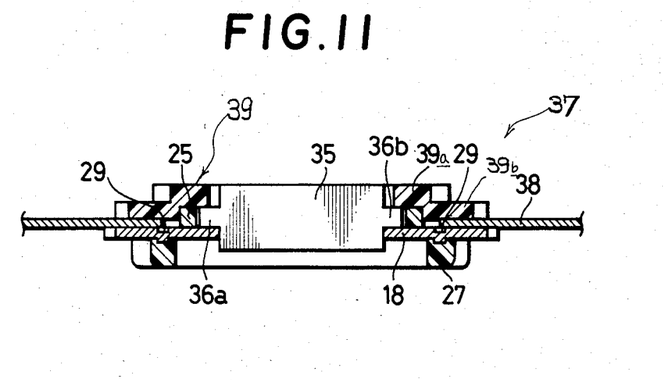
FIG. 11 is a sectional view taken along the line D—D on FIG. 10.
Figure 12:
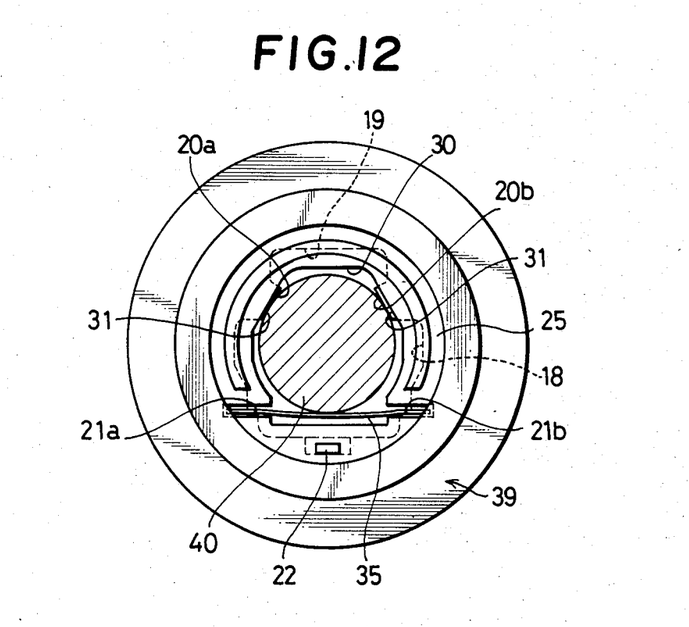
FIG. 12 is a plan view showing the hub structure of the completed flexible magnetic disc according to this invention installed on a drive spindle.

Referring now to FIGS. 10, 11 and 12, it will be seen that a flexible magnetic disc 37 in accordance with an embodiment of this invention generally comprises a flexible magnetic sheet member 38 having a circular periphery, and a hub structure secured to sheet member 38 at the center of the latter and which includes a generally circular metal plate 18, an annular body 25 and a guide ring 27 molded of a suitable synthetic resin on metal plate 18, a metal spring 35 and an annular retainer 39 which is molded of a suitable synthetic resin separately from annular body 25 and later secured to the latter in the course of the assembling of flexible magnetic disc 37, as hereinafter described. It will be understood that the flexible magnetic disc 37 according to this invention may be desirably incorporated in a cassette having a casing similar to the casing 2 of FIGS. 1A and 1B for protecting the magnetic sheet member 38 when the cassette is not in use.

Figure 2:
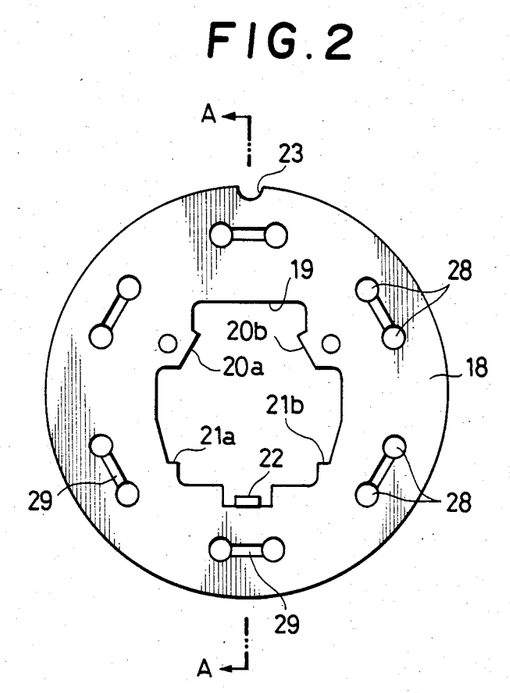
FIG. 2 is an enlarged plan view of a metal plate included in the hub structure of a flexible magnetic disc according to an embodiment of the present invention.
Figure 3:
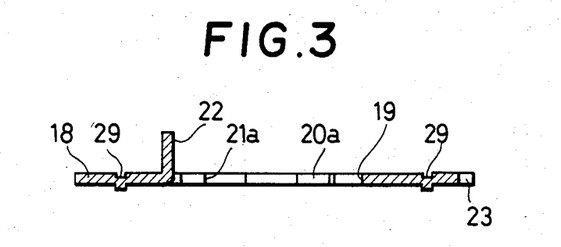
FIG. 3 is a sectional view taken along the line A—A on FIG. 2.

Referring now to FIGS. 2 and 3, it will be seen that metal plate 18 is punched or stamped from a soft iron plate or similar magnetic sheet material so as to have a circular outer periphery and a central aperture 19. Edge portions of aperture 19 define metal positioning surfaces 20a and 20b spaced apart at opposite sides of a plane of symmetry extending diametrically across circular plate 18, as along the line A—A. The positioning surfaces 20a and 20b are shown to be linear and to converge in the direction away from the center of aperture 19. Portions of the edge of aperture 19 also define positioning seats 21a and 21b for the metal spring 35, as hereinafter described in detail. The spring seats 21a and 21b are shown to be aligned transversely at opposite sides of the plane of symmetry of plane 18, that is, at opposite sides of the diametrical line A—A which corresponds to the bi-sector of the angle enclosed by the linear converging positioning surfaces 20a and 20b.

The circular metal plate 18 which, as hereinafter described in detail ensures the precise positioning of the flexible magnetic disc 37 according to this invention relative to a drive spindle 40 inserted into the hub structure, as shown on FIG. 12, also functions as a magnetic yoke which is magnetically attracted to a chucking magnet of the disc drive unit of the kind disclosed in application Ser. No. 06/537,989. In other words, circular plate 18 also performs the function of the permalloy ring 9 shown on FIG. 1B to be included in the previously proposed flexible magnetic disc.

Further, as shown on FIGS. 2 and 3, an integral tab 22 is struck upwardly from circular metal plate 18 at a location on the edge of central aperture 19 lying along the plane of symmetry of plate 18. When flexible magnetic disc 37 embodying this invention is mounted on a disc drive unit of the kind disclosed in application Ser. No. 06/537,989, the upwardly struck tab 22 of metal plate 18 is useful for detecting rotational positions of disc 37, that is, in the course of rotation of disc 37, upwardly struck tab 22 comes into opposing relation to a rotation detector of the disc drive unit which senses the leakage flux of the chucking magnet and correspondingly generates a pulse representing the rotational phase of the rotated disc 37. Since the upwardly struck tab 22 is formed on the plane of symmetry containing the line A—A, it is easy to maintain dynamic balance of metal plate 18 during rotation of the latter with disc 37. More particularly, for achieving a good dynamic balance, a notch or cutout 23 may be formed in the outer periphery of circular plate 18 substantially in diametrically opposed relation to the tab 22 on line A—A.

Figure 4:
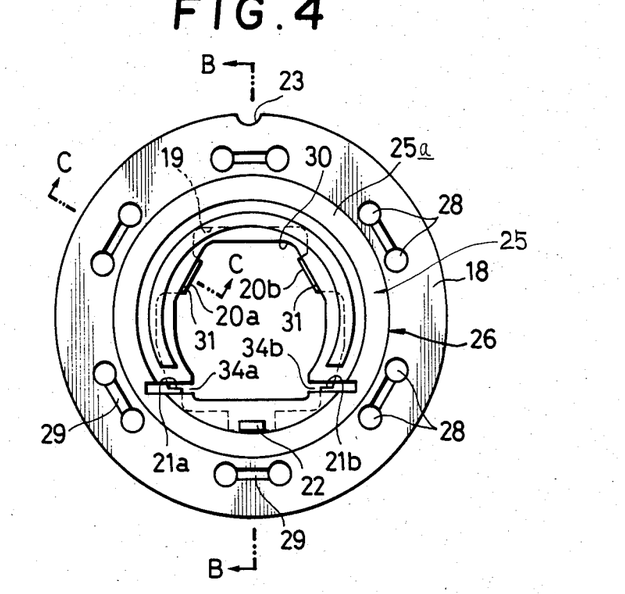
FIG. 4 is a plan view similar to that of FIG. 2, but showing an annular body also included in the hub structure embodying this invention, and which is shown molded on the metal plate of FIG. 2.
Figure 5:
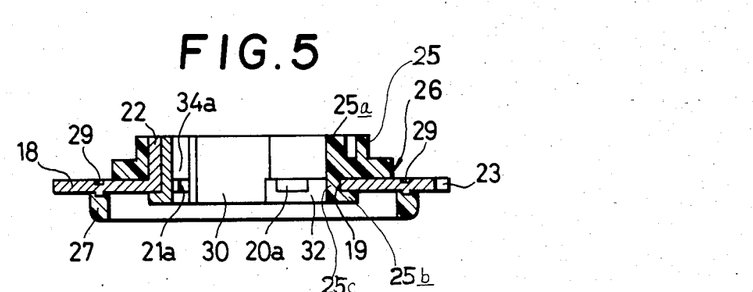
FIG. 5 is a sectional view taken along the line B—B on FIG. 4.

Referring now to FIGS. 4 and 5, it will be seen that the annular body 25 molded of a suitable synthetic resin on metal plate 18 includes annular portions 25a and 25b disposed against opposite faces of metal plate 18 and a connecting portion 25c extending therebetween through the central aperture 19 (FIG. 5) with an inner surface of the connecting portion 25c defining a bore 30 which extends axially through the hub structure and substantially registers with aperture 19. It will be seen that circular metal plate 18 extends radially outward substantially beyond annular portions 25a and 25b of body 25 to define a mounting flange surface for the magnetic sheet member 38 at the face of metal plate 18 which is directed upwardly in FIGS. 5, 10 and 11. The magnetic sheet member 38 has a central circular hole which receives and is guided by the outer circular peripheral surface 26 of body portion 25a when the magnetic sheet member seats against the mounting flange surface of metal plate 18.

Figures 6, 7:
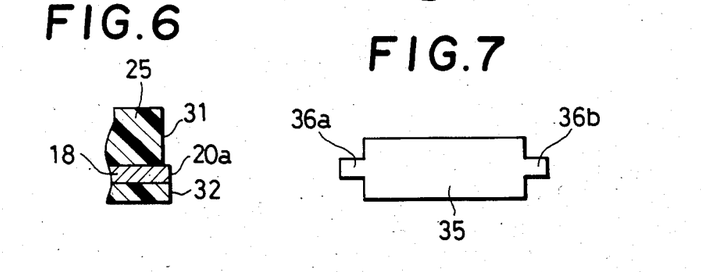
FIG. 6 is a further enlarged, fragmentary sectional view taken along the line C—C on FIG. 4.
FIG. 7 is a plan view of a metal spring which is also included in the hub structure embodying this invention.
Figure 8:
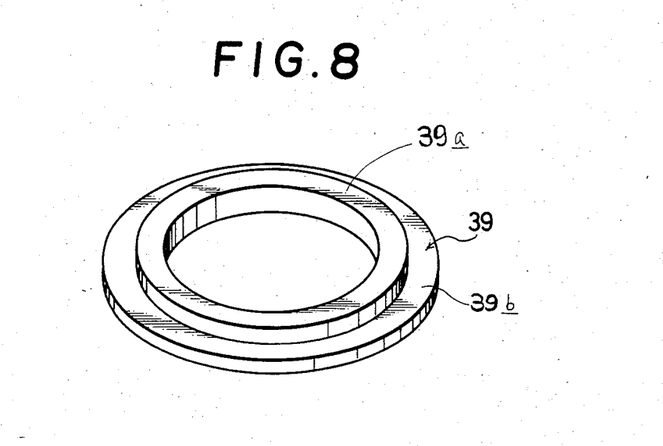
FIG. 8 is a perspective view of an annular retainer which is assembled on the molded annular body of FIGS. 4 and 5 for completing the hub structure of the flexible magnetic disc according to this invention.

As shown particularly on FIGS. 4 and 5, the cross-section of bore 30 is generally smaller than the central aperture 19 of metal plate 18. However, as shown on FIGS. 4 and 6, the metal positioning surfaces 20a and 20b on circular metal plate 18 project inwardly beyond the surface portion 31 of annular body 25 defining the bore above the plane of plate 18. The portion 32 of the inner surface of body 25 defining bore 30 below the plane of plate 18 is flush with positioning surfaces 20a and 20b. By reason of the foregoing relationships, when the drive spindle 40 is positioned in bore 30 as shown on FIG. 12, the outer surface of spindle 40 is engageable with positioning surfaces 20a and 20b of metal plate 18 for accurately and reliably centering disc 37 relative to spindle 40. However, due to the flush relation of the lower surface portion 32 of bore 30 in respect to positioning surfaces 20a and 20b, such surface portion 32 acts to guide drive spindle 40 past positioning surfaces 20a and 20b during insertion into bore 30 and prevents abrasion of the spindle by edges of positioning surfaces 20a and 20b, which abrasion would deleteriously affect the accuracy with which the disc 37 can be centered relative to the drive spindle. The guide ring 27, which is desirably molded of synthetic resin on circular metal plate 18 simultaneously with annular body 25 is spaced radially outward from the annular portion 25a of body 25 for exposing the downwardly directed face of metal plate 18 therebetween. For molding guide ring 27 on metal plate 18 at the underside of the latter, such metal plate 18 is desirably formed with pairs of holes 28 and connecting grooves 29 in the outer portion of plate 18.

As shown particularly on FIG. 4, annular body 25 is molded with spaced recesses or slits 34a and 34b opening toward each other into bore 30 and exposing the positioning seats 21a and 21b which are substantially centered with respect to the widths of the respective recesses 34a and 34b. As shown on FIG. 7, the metal spring 35 is in the form of an elongated leaf dimensioned so that its opposite end portions will be received in recesses 34a and 34b and engage against seats 21a and 21b, respectively, when metal leaf spring 35 extends transversely across bore 30 in respect to the bi-sector of the angle enclosed by positioning surfaces 20a and 20b, as shown on FIG. 12. Further, when metal spring 35 is thus operatively positioned, projections 36a and 36b extending from control portion of its opposite ends; respectively, rest on metal plate 18 just beyond seats 21a and 21b, as particularly shown on FIG. 11. Thus, spring 35 is held against downward movement relative to metal plate 18, as viewed on FIG. 11.

Figure 9:
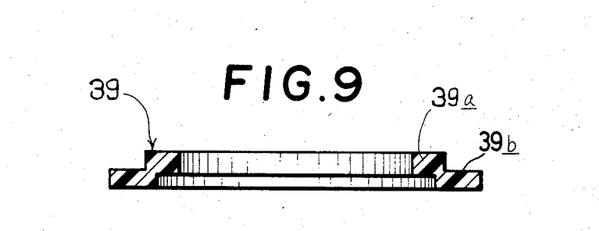
FIG. 9 is a diametrical sectional view of the annular retainer of FIG. 8.

The annular retainer 39 is shown on FIG. 9 to have a stepped cross-section and to include a relatively small diameter upper portion 39a which is adapted to extend inwardly over recesses 34a and 34b for retaining end projections 36a and 36b of spring 35 against metal plate 18, as shown particularly on FIG. 11, and a relatively larger diameter lower portion 39b which extends radially outward beyond the circular outer periphery 26 of the annular portion 25a of body 25 as particularly shown on FIG. 10.

In assembling the above described flexible magnetic disc 37 according to this invention, the metal spring 35 is first inserted in recesses 34a and 34b. Then, the flexible magnetic sheet member 38 is placed from above on the upwardly directed face of circular metal plate 18 so as to extend around the circular peripheral surface 26 of molded annular body 25. Finally, annular retainer 39 is places, from above, onto body 25 and is welded to the latter, as by high frequency welding, so as to retain metal spring 35 in its operative position extending across bore 30 and further to fix or clamp magnetic sheet member 38, adjacent its central hole, to the hub structure between the mounting flange surface on metal plate 18 and the large diameter portion 39b of annular retainer 39.

It will be appreciated that, when a drive spindle 40 is inserted into the bore 30 of flexible magnetic disc 38, metal spring 35 is effective to resiliently urge spindle 40 against the converging positioning surfaces 20a and 20b of metal plate 18, with the result that disc 37 is accurately centered relative to the drive spindle, as shown on FIG. 12. Since the surfaces 20a and 20b for positioning disc 37 relative to drive spindle 40 are formed on the metal plate 18 by a punching operation, such surfaces 20a and 20b can be very accurately formed for improved precision in centering of the disc. Further, the metal spring 35 is positioned relative to the surfaces 20a and 20b by means of the metal seats 21a and 21b also formed on metal plate 18 and, by reason of the accurate punching or stamping of plate 18, the accurate relative positioning of spring 35 in respect to positioning surfaces 20a and 20b can be ensured. Thus, a constant spring force against the drive spindle is ensured which is free of variations from one disc to another. It is also to be appreciated that, since the positioning surfaces 20a and 20b, the spring 35 and the seats 21a and 21b for the spring are all formed of metal, the parts of disc 37 which determine the centering of the latter relative to the drive spindle 40 are not prone to wear and, therefore, stable centering of each disc can be ensured over a long useful life thereof.

As earlier noted, circular metal plate 18, in addition to defining the metal positioning surfaces 20a and 20b for engagement with the spindle and the metal seats 21a and 21b for accurate positioning of the spring 35, acts as a magnetic yoke. In other words, when a drive spindle is inserted in bore 30, a chucking magnet (not shown) which is included in the disc drive unit shown in the application Ser. No. 06/537,989, can act magnetically on the portion of plate 18 exposed between guide ring 27 and the lower annular portion 25b of body 25 for securely anchoring the flexible magnetic disc 37 to the disc drive unit.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. A flexible magnetic disc adapted for mounting on a drive spindle of a recording and/or reproducing apparatus, comprising:
    a flexible magnetic sheet member having a circular periphery;
    an elongate resilient member; and
    a hub structure secured to said sheet member at the center of the latter and having a bore extending axially therethrough for receiving the drive spindle, said hub structure being an annular body of synthetic resin molded material including metal means defining a pair of positioning surfaces projecting into said bore at locations spaced apart about a central axis of said bore and a pair of seat means projecting into said bore at locations spaced apart about the axis of said bore and in opposing relationship with said pair of positioning surfaces, said pair of seat means including a corresponding pair of recesses adapted for receiving respective ends of said elongate resilient member and, said elongate resilient member also projecting into said bore at a side of the latter in opposing relationship with said pair of positioning surfaces when said ends of said elongate resilient member are seated in respective ones of said pair of recesses, and being engageable with the drive spindle therein for securely seating the drive spindle against said pair of positioning surfaces, and whereby said structure mitigates disc deformations in an operational mode.

2. A flexible magnetic disc according to claim 1; in which said resilient member is a metal spring.

3. A flexible magnetic disc according to claim 2; in which said metal means includes a substantially circular metal plate with a central aperture substantially registering with said bore, and in which said pair of positioning surfaces are defined by respective portions of the edge of said aperture, and said edge of the aperture further defines said pair of seat means for seating respective ends of said metal spring thereagainst.

4. A flexible magnetic disc according to claim 3; in which said pair of positioning surfaces are linear and converge in the direction away from said axis, and said metal spring is a leaf spring engaging at its opposite ends against said pair of seat means and extending transversely in respect to a bisector of an angle enclosed by said linear, converging pair of positioning surfaces.

5. A flexible magnetic disc according to claim 3; in which said hub structure further includes an annular body of synthetic resin molded on said circular metal plate and having an inner surface defining said bore, a portion of said inner surface of the annular body below the plane of said circular metal plate being flush with said pair of positioning surfaces on the latter for guiding the drive spindle past said positioning surfaces on insertion into said bore.

6. A flexible magnetic disc according to claim 3; in which said hub structure further includes an annular body of synthetic resin molded on said circular metal plate and having an inner surface defining said bore, said annular body has spaced recesses opening at said inner surface and exposing said seat means, and said metal spring has end portions received in said recesses and precisely located by said seat means.

7. A flexible magnetic disc according to claim 6; in which said hub structure further includes an annular retainer which extends over said recesses for retaining said end portions of the metal spring therein.

8. A flexible magnetic disc according to claim 7; in which said annular retainer is also molded of synthetic resin, and said annular retainer and body of synthetic resin are welded to each other.

9. A flexible magnetic disc according to claim 8; in which said annular body has a circular outer surface, said substantially circular metal plate extends radially outward beyond said outer surface of the annular body to define a mounting flange for said magnetic sheet member, said magnetic sheet member has a central circular hole the edge of which engages and is guided by said circular outer surface of the annular body when said magnetic sheet member seats against said mounting flange, and said annular retainer also extends radially outward beyond said circular outer surface to secure said magnetic sheet member to said hub structure between said mounting flange and said annular retainer.

10. A flexible magnetic disc according to claim 9; in which said pair of positioning surfaces are linear and converge in the direction away from said axis, and said metal spring is a leaf spring extending transversely in respect to a bisector of an angle enclosed by the linear, converging pair of positioning surfaces.

11. A flexible magnetic disc according to claim 10; in which a portion of said inner surface of the annular body below the plane of said circular metal plate is flush with said positioning surfaces on the latter for guiding the drive spindle past said positioning surfaces on insertion into said bore.

12. A flexible magnetic disc according to claim 11; in which said circular metal plate has an integral tab struck therefrom at said edge of said central aperture and embedded in said molded annular body for use in detecting rotational positions of the disc, and a cutout is formed in the outer periphery of said circular metal plate substantially in diametrically opposed relation to said tab for achieving dynamic balance of said hub structure.

13. A flexible magnetic disc according to claim 12; in which a diametrical line between said tab and cutout is substantially aligned with said bisector of the angle enclosed by the linear, converging pair of positioning surfaces.

14. A flexible magnetic disc according to claim 3; in which said hub structure further includes a body of synthetic resin molded on said circular metal plate and having annular portions disposed against opposite faces of said metal plate and a connecting portion extending therebetween through said central aperture with an inner surface of said connecting portion defining said bore, said circular metal plate extends radially outward beyond said annular portions of the body to define a mounting flange surface for said magnetic sheet member at one of said faces of the metal plate, said magnetic sheet member has a central circular hole which receives, and is guided by the one of said annular portions adjacent said one face when said magnetic sheet member seats against said mounting flange surface, and an annular retainer also molded of synthetic resin and extending radially outward over and beyond said one annular portion of the body and being secured to the latter for fixing said magnetic sheet member adjacent said central hole to said hub structure between said mounting flange surface and said annular retainer.

15. A flexible magnetic disc according to claim 14; in which said hub structure further includes a guide ring of synthetic resin molded against the other face of said circular metal plate and spaced radially outward from said annular portion of the body which is against said other face to expose said metal plate therebetween for magnetic attraction to a portion of said drive spindle when the flexible magnetic disc is mounted thereon.

16. A flexible magnetic disc adapted for mounting on a drive spindle of a recording and/or reproducing apparatus, comprising:
   a flexible magnetic sheet member having a circular periphery;
   a hub structure secured to said sheet member at the center of the latter and having a bore extending axially therethrough for receiving the drive spindle, said hub structure being an annular body of synthetic resin molded material including metal means defining a pair of positioning surfaces projecting into said bore at locations spaced apart about a central axis of said bore; and
   an elongate metal resilient member also projecting into said bore at a side of the latter in opposing relationship with said pair of positioning surfaces, ends of said elongate metal resilient member being seated in respective recesses of a pair of seat means formed in said hub structure and projecting into said bore, such that said metal resilient member is engageable with the drive spindle for securely seating the drive spindle against said pair of positioning surfaces, and whereby said structure mitigate disc's deformations in an operational mode.

17. A flexible magnetic disc according to claim 16, wherein said metal means including in said hub structure comprises a ring-shaped metal element having a periphery upon which said sheet member is embedded and said hub structure further includes a resin member molded on an inner portion of said ring-shaped metal element thereby to form said bore and in which is formed said pair of recesses into which ends of said metal resilient element are positioned.

18. A flexible magnetic disc according to claim 17, wherein said hub structure further comprises an annular ring element mounted on top of said hub member thereby to cover said pair of recesses.

19. A flexible magnetic disc adapted for mounting on a drive spindle of a recording and/or reproducing apparatus, comprising;
   a flexible magnetic sheet member having a circular periphery; and
   a hub structure secured to said sheet member at the center of the latter and having a bore extending axially therethrough for receiving the drive spindle, said hub structure being an annular body of synthetic resin molded material including metal means defining a pair of metal positioning surfaces projecting into said bore at locations spaced apart about a central axis of said bore, an elongated resilient member also projecting into said bore at a side of the latter in opposing relationship with said pair of metal positioning surfaces, and said hub structure further defining seat means including a pair of recesses for receiving ends of said elongate resilient member, and said elongated resilient member being engageable with the drive spindle therein for securely seating the drive spindle against said pair of metal positioning surfaces, and whereby said structure mitigates disc deformations in an operational mode.

20. A flexible magnetic disc according to claim 19, wherein said metal means included in said hub structure is comprised of a ring-shaped metal element having said pair of metal positioning surfaces extending along inner edges thereof and said hub structure further includes a resin member molded on an inner portion of said ring-shaped metal element to form said bore while positioning said pair of said metal positioning surfaces.

* * * * *